Sept. 27, 1932.    G. DE DOMINICIS    1,879,124
TAPING MACHINE
Filed March 13, 1930
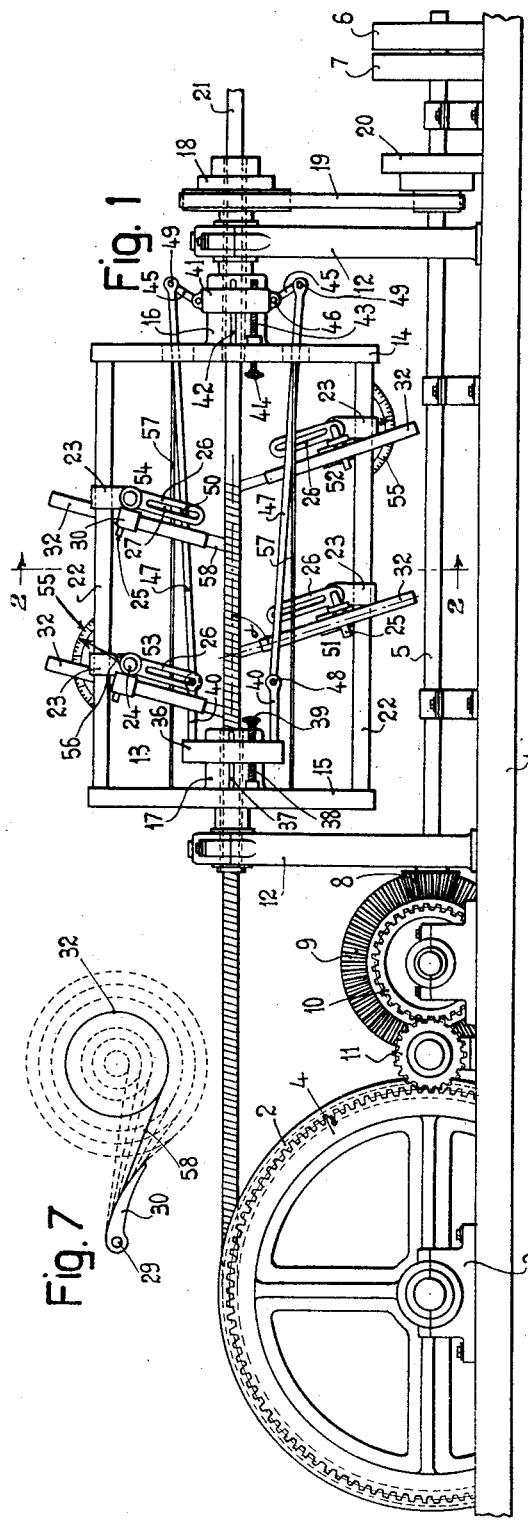
Inventor:
Gaetano de Dominicis
By
Attorney Patented Sept. 27, 1932

1,879,124

UNITED STATES PATENT OFFICE

GAETANO DE DOMINICIS, OF TURIN, ITALY

TAPING MACHINE

Application filed March 13, 1930, Serial No. 435,606, and in Italy March 15, 1929.

The present invention relates to machines intended to coil helically tapes of paper or other material on a cable or core which is caused to move longitudinally through the machine.

The present invention comprises a machine of said kind with a plurality of coiling pitches, that is, the pitch may be increased or decreased as desired, and having peculiar heads carrying reels of tape to be wound on the cable; further it comprises an arrangement intended to direct and arrange said tapes delivered by said heads in a manner proper for producing the tape coiling and to cause them to overlap each other in the requisite manner. Said arrangement acts at the same time on all the tapes. Further this machine comprises means to make uniform the tape stretching and may, if desired, include supplemental tape guide means located close to said cable.

The machine of this invention may be used to coil tapes of any material and for any purpose on a core of any material having any preferred uniform cross section.

On the annexed drawing are shown by way of example two embodiments of this invention with the understanding that while for sake of simplicity the machine herein illustrated comprises a single rotary member or cage, but of course it may also comprise a plurality of such rotary members.

In the annexed drawing:

Figure 1 is a diagrammatical side view of the machine;

Figure 2 is a fragmentary section on line 2—2 of Fig. 1;

Figure 3 is a fragmentary detail view of a tape delivery head;

Figure 4 is a front view of head shown in Figure 3;

Figure 5 is a top view of the same;

Figure 6 is a fragmentary view of another construction;

Figure 7 is a diagram showing the configuration of a tape guiding and tape reel braking member.

The machine illustrated comprises a bed 1 on which a drum 2 is mounted to rotate in bearings 3, said drum serving to feed the taped core; said drum supplies the core which has been taped in the machine to a collecting reel (not shown) and is driven in rotation by a gear 4 integral therewith and actuated by driving shaft 5 through pinions 8, 9, 10, 11. The dispensing reel is not shown.

The driving shaft 5 journalled in the machine bed carries loose and fast pulleys 6 and 7 to be driven by a belt not shown by any suitable source of power, and, to provide for several coiling pitches, a stepped pulley 20 which drives, by a belt 19, a cooperating stepped pulley 18 integral with a cage shown in its whole by reference 13. Said cage 13 is mounted to revolve on uprights 12—12 of bed 1 and comprises disks 14, 15 and bars 22 interconnecting said disks and supporting said heads. Disks 14, 15 are provided with hollow hubs 16, 17 journalled in said uprights.

The core or cable to be taped is fed by a supply reel not shown and runs through hollow hub 16, cage 13 and hollow hub 17 to said driving drum and collecting reel not shown.

In the embodiment shown in Figures 1 and 2, the cage 13 comprises two bars 22 spaced apart through 180° and two tape delivering heads on each bar, said heads being shown by 51, 52, 53 and 54.

Each tape delivering head comprises a support 23 suitably fastened on bar 22 and having a spindle 24 mounted thereon, said spindle having a transverse pivot 25 which is able to oscillate in a plane parallel with the axis of core 21 travelling through cage 13. Each spindle 24 has integral therewith an arm 26, which has a slot 27 and provides a pointer 28 parallel to spindle 24 for the hereinafter described purpose. A stem 29 is solid with spindle 24 and parallel to pivot 25 and on said stem is adjustably fastened a tape guide shoe 30.

Pivot 25 provides a flange 31 and a tape carrying bobbin 32 is loose on said pivot, said bobbin being frictionally engaged with flange 31 by means of an annular disk 33 acted on by a spring 34 and a wing-nut 35 adjustably screwed on screwthreaded end of pivot 25.

On the extension of hub 17 is mounted to move longitudinally a collar 36 driven in rotation therewith by means of longitudinal studs 37. A screwthreaded spindle 38 having a manipulating knob 39 and engaged to rotate in disk 15 but locked thereon in longitudinal direction, engages a screwthreaded hole of collar 36, the manipulation of knob 39 thus shifting and locking said collar 36 adjustably on hub 17. Studs 40 extend longitudinally from collar 36, one for each of head carrying bars 22.

A collar 41 similar to the above described one is mounted on hub 16 said collar being driven in rotation by studs 42 slidingly engaging it, and adjusted longitudinally by a screwthreaded spindle 43 having a manipulating knob 44; links 45 are pivoted at 46 on collar 41 there being one of said links 45 for each of the studs 40.

Each stud 40 is connected with cooperating link 45 by means of a rod 47 pivoted thereon at 48 and 49 respectively. Rod 47 has pins 50 each engaging slot 27 of arm 26 of one of tape bobbin carrying heads.

The pivot pin 48 acting for interconnection of oscillating rod 47 with stud 40 is at the same time engaged with the slotted arm 26 of the adjacent head as shown in connection with head 53, while pins 50 engaging slotted arms 26 of heads 51, 52, 54 are spaced from each other along rod 47 through the same distance as their respective spindles 24 are spaced along supporting bars 22.

Heads 52 and 53 adjacent to end disks 14, 15 of cage 13 are provided each with a scale dial 55 on which moves a pointer 56 extending from spindle 24 of the cooperating head.

As shown in Figure 2, intermediate the guide shoe 30 and core 21 two adjacent rods 57 parallel with the axes of core 21 and support bars 22 are fastened. Said rods 57 provide supplemental guide means for the tape such supplemental guide means being necessary only when cores having extensively different diameters are to be taped. As shown in Figure 2, the last portion of tape coming from shoe 30 to core 21 lies in a plane passing through the axis of the core and the final portion of the same is deflected from such a plane to a small angle in accordance with the diameter of cable or core to be taped. The plane passing intermediate the rods 57 and contacting shoe 30 must be perpendicular to spindle 24. Therefore when the tape bobbin oscillates with spindle 24 and moves through an angle $\alpha$, the last portion of said tape is itself inclined through the same angle and is caused to lie along tangent $\alpha$ with respect to core to be taped, as required for securing a helical winding under inclination $\alpha$.

Before describing the machine operation the following considerations are developed.

In machines according to the present invention points where tape bobbin carrying heads are fastened are located at equal distances apart along a helix connecting them in the direction of revolution of the cage, that is in the direction under which tapes are attached for coiling. Such a helix may be assumed to be wound on an imaginary immaterial cylinder having its axis coincident with that of core 21 and passing very close to supporting bars 22.

Therefore heads and supporting bars 22 must be spaced from each other through angles equal to each other, and further the distance intermediate the two subsequent heads, as measured in the direction of axis, is constant.

Such distance which is hereinafter referred to as —$d$— and is the distance intermediate planes perpendicular to the core axis and passing through subsequent heads of any pair, is the portion of pitch of said helix corresponding with the angular spacing intermediate such two subsequent heads.

The said helix is defined, in respect of the type of machine, say with one, two, three or more supporting bars 22, the number of heads on each bar being immaterial, by the following formula:

$$\frac{d}{p_m} = s + f + m,$$

where —$d$— is the above defined longitudinal distance intermediate any two subsequent heads and $p_m$ is any of pitches which may be secured by the particular machine; —$f$— is the amount of overlap of two subsequent tapes, —$s$— is the portion of one revolution through which the cage 13 must rotate to carry a given head or supporting bar into the position of that preceding it, —$m$— is a coefficient which may have any of values of whole numbers 0, 1, 2, 3 and so on in respect of first, second, third, fourth pitch of the machine. Therefore assuming the machine pitches to be $P_1, P_2, P_3 \ldots$ $$\frac{d}{p_1} = s+f; \frac{d}{p_2} = (s+f)+1; \frac{d}{p_3} = (s+f)+2.$$

To give an example in respect of the embodiment illustrated on the drawing, it is assumed that the grade of overlap of tapes is ½ (that is, as most generally required, that the edge of a tape lies in register with the middle line of tape wound before that under consideration). The supporting bars 22 being two by number and spaced through 180° from each other, the fraction of revolution is ½. Therefore the sum $s+f$ is equal to one. The above formulae will then be:

$$\frac{d}{p_1} = 1; \frac{d}{p_2} = 2; \frac{d}{p_3} = 3.$$

Therefore once first pitch $p_1$ is assumed, the distance —$d$— required for the construction of the machine and for defining other pitches $p_2, p_3$ is found. Of course, a different value from ½ may be selected for the grade of overlap, and therefore —$f$— may vary between 0 and 1.

The machine operation is described as follows: In inoperative position links 45 are down and rods 47 lie on a cylinder having its axis coincident with that of core 21 that is with axis of revolution of cage 13. In this position all slotted arms 26 are engaged by respective pins 50 at the same distance from axes of oscillation of spindles 24, and therefore they are parallel with each other and inclined to the same angle with respect to the core axis. Therefore pivots 25 of the several heads and bobbins 32 mounted thereon are parallel and similarly inclined with respect to the axis of the core 21.

On collar 36 being moved longitudinally by means of knob 44 and screwthreaded spindle 43, rods 47 spread to a cone having a circular cross section; because of interconnection provided by links 45 an alteration of inclination of rods 47 around their pivot point 48 is secured. In this oscillation pins 50 of rods 47 move arms 26 of heads 51, 52, 53, 54 through gradually different angles. In this manipulation arm 26 of head 53 is not affected by angularity of rod 47, it being engaged by pivot pin 48 which is the fulcrum of oscillation of rod 47.

Adjustment of collar 36 is stopped when on dial 55 of head 52 an angle is read which agrees with the theoretical angularity of winding.

By this manipulation on dial 55 of head 53 an angle will be read which usually is not the theoretical angularity required in respect of head 53. Then collar 41 is shifted towards right or left by manipulating knob 44 and screw-threaded spindle 43, to increase or reduce the angularity of rods 47 until on said dial an angle agreeing with the theoretical angle is read. By the above described adjustment tapes are caused to take up the correct angularity required for their winding and are in a position adapted for required grade of overlap, this result being secured without regard to the machine pitches. Of course, the better the machine has been devised and made and correct rules have been complied with in machining, the closer is the approximation.

In this connection it is to be borne in mind that the theoretical angularity is given by formula $$\tan \alpha = \frac{p}{\pi D}$$

where —$p$— is the machine pitch, that is, the pitch of winding, and D is the diameter of the core or cable in register with the point where the tape is affixed, that is, the diameter of the bare core in respect of the first bobbin, or the same diameter increased of the tape thickness in respect of other bobbins.

Then the winding operation is carried out after having attached tapes delivered by several heads on the core or cable to be taped. Pointers 28 assist this operation because each of them defines the correct inclination along which the tape must lie during the winding operation.

Figure 6 shows a modified embodiment comprising only two tape delivering heads, that is a single head for each supporting bar. Bars 22' supporting said heads are located on opposite sides of a disk 14' mounted to revolve on its hollow hub 15' around the core axis. Collars 36' and 41' are mounted in the described manner on hub 15', and collar 36' has a pin 48' intended to engage slotted arm 26 of the adjacent head, while on both collars 36', 41' is fulcrumed by means of link 45', an oscillatable rod 47' having a pin 50' adapted to engage the cooperating slotted arm 26 of adjacent head.

The operation is the same as above described.

This invention also comprises means for adjusting the tension or stretching of the delivered tapes. For this purpose the guiding and braking shoe 30 of each head is shaped in accordance with the envelope of subsequent tangents to decreasing delivery radii as shown in Fig. 7. The portions of tangents availed of may be equal or they may decrease according to any logarithmic or exponential law. The contour and angularity of said shoes may also be found by tests. As shown in Fig. 7, the extent of the portion of the shoe contacted by tape is gradually decreasing, in agreement with the decrease of delivery radius of tape bobbin.

A decreasing braking action is secured which makes even the tension or stretching of last portion of tape bobbin to remove drawback found in all constructions of brakes acting on head bobbins and consisting in that the leverage under which the tape being delivered acts on its bobbin or reel is decreasing while the brake has a constant action, this fact producing an increasing tension or stretching on the tape.

What I claim as my invention and desire to secure by United States Letters Patent is:

1. A taping machine comprising means for feeding longitudinally a core to be taped, a cage encircling said core, means for producing a respective rotation of said cage and core, tape supplying means mounted in said cage at points arranged along a helix, said tape supplying means being capable of oscillation to adjust the angularity of tape supplied thereby with respect to axis of said core, and adjustable means engaging said supplying means to control their angularity, the manipulation of said adjustable control means altering the angularities of said supplying means through different extents to cause each of them to deliver its tape under correct angularity in accordance with the diameter of the core where said tape is wound on said core.

2. A taping machine comprising means for feeding longitudinally a core to be taped, a cage encircling said core, means for producing a respective rotation of said cage and core, tape delivering means mounted to oscillate in said cage to adjust the angularity of tape supplied thereby with respect to axis of said core, adjustable means engaging said delivering means to control their angularity, manipulating means shifting said adjustable means to commonly alter the angularity of said delivering means, and other manipulating means shifting said adjustable means to alter the angularity of said delivering means through different extents to cause each of them to deliver its tape under correct angularity in accordance with the diameter of the core where said tape is wound on said core.

3. A taping machine comprising means for feeding longitudinally a core to be taped, a cage encircling said core, means for producing a respective rotation of said cage and core, tape delivering means mounted to oscillate in said cage to adjust the angularity of tape supplied thereby with respect to axis of said core, adjustable means engaging said delivering means to gradually control their angularity, manipulating means shifting said adjustable means, and other manipulating means shifting said adjustable means to alter the adjustment of said delivering means imparted thereby to cause each of them to deliver its tape under correct angularity in accordance with the diameter of the core where said tape is wound on said core.

4. A taping machine comprising means for feeding longitudinally a core to be taped, a cage encircling said core, means for producing a respective rotation of said cage and core, tape delivering means mounted to oscillate in said cage to adjust the angularity of tape supplied thereby with respect to axis of said core, adjustable means engaging said delivering means to control their angularity, manipulating means shifting said adjustable means to commonly alter the angularity of said delivering means, and other manipulating means shifting said adjustable means to alter the angularity of said delivering means through different extents to cause each of them to deliver its tape under correct angularity in accordance with the diameter of the core where said tape is wound on said core, the interengagement of said adjustable means with one of said heads delivering its tape on said core leaving the last named head unaffected by the operation of said second named manipulating means.

5. A taping machine comprising means for feeding longitudinally a core to be taped, a cage encircling said core, means for producing a respective rotation of said cage and core, tape delivering heads each comprising a spindle mounted to oscillate on said cage, a pivot carried by said spindle, a tape bobbin free on said pivot and an arm integral with said spindle and pivot, a bar pivoted at one of its ends and engaging said head arms at points spaced along the extent of said bar, and manipulating means for adjusting angularly said bar around its pivoted end.

6. A taping machine comprising means for feeding longitudinally a core to be taped, a cage encircling said core, means for producing a respective rotation of said cage and core, tape delivering heads each comprising a spindle mounted to oscillate on said cage, a pivot carried by said spindle, a tape bobbin free on said pivot and an arm integral with said spindle and pivot, a support, a bar pivoted at one of its ends on said support and engaging said heads arms at points spaced along the extent of said bar, manipulating means for adjusting angularly said bar around its pivoted end, and manipulating means for shifting said support longitudinally of said core and cage.

7. A taping machine comprising means for feeding longitudinally a core to be taped, a cage encircling said core, means for producing a respective rotation of said cage and core, tape delivering heads each comprising a spindle mounted to oscillate on said cage, a pivot carried by said spindle, a tape bobbin free on said pivot and an arm integral with said spindle and pivot, a support, a bar pivoted at one of its ends on said support and engaging said head arms at points spaced along the extent of said bar, manipulating means for adjusting angularly said bar around its pivoted end, and manipulating means for shifting said support longitudinally of said core and cage, the arm of one of said heads delivering its tape on the said core being engaged with the pivot point of said bar on said support.

8. A taping machine comprising means for feeding longitudinally a core to be taped, a cage encircling said core, means for producing a respective rotation of said cage and core, tape delivering heads each comprising a spindle mounted to oscillate on said cage, a pivot carried by said spindle, a tape bobbin free on said pivot and an arm integral with said spindle and pivot, a collar movable longitudinally on said cage, manipulating means for adjusting said collar, a second collar spaced from first named one and movable longitudinally on said cage, manipulating means for adjusting said collar, links pivoted on said second named collar, bars each having one end pivoted on one of said links and its other end pivoted on said first named collar, and means on each of said bars engaging the arms of a set of said heads, the arm of one of said heads delivering its tape on the said core being engaged with the fulcrum point of one of said bars on the said first named collar.

9. A taping machine comprising means for feeding longitudinally a core to be taped, a cage encircling said core, means for producing a respective rotation of said cage and core, tape delivering means mounted to oscillate in said cage to adjust the angularity of tape supplied thereby with respect to axis of said core, a number of said delivering means comprising cooperating dial and pointer to show their angularity, and adjustable means engaging said delivering means to control their angularity, the manipulation of said adjustable control means altering the angularities of said delivering means through different extents to cause each of them to deliver its tape under correct angularity in accordance with the diameter of the core in accordance with which said tape is wound on said core.

10. A taping machine comprising means for feeding longitudinally a core to be taped, a cage encircling said core, means for producing a respective rotation of said cage and core, tape supplying means mounted to oscillate in said cage at points arranged along a helix, said tape supplying means being capable of oscillation to adjust the angularity of tape supplied thereby, with respect to axis of said core, tape guiding means adjacent to said core and providing at least one bearing line parallel with the core axis, and adjustable means engaging said supplying means to control their angularity, the manipulation of said adjustable control means altering the angularities of said supplying means through different extents to cause each of them to deliver its tape under correct angularity in accordance with the diameter of the core in accordance with which said tape is wound on said core.

11. A taping machine comprising means for feeding longitudinally a core to be taped, a cage encircling said core, means for producing a respective rotation of said cage and core, tape delivering heads mounted in said cage at points arranged along a helix, said delivering heads being capable of oscillation to adjust the angularity of tape supplied thereby with respect to axis of said core, a tape delivering bobbin loose on each of said heads, a tape guide on each head providing a bearing line parallel with the rotary axis of its bobbin, and adjustable means engaging said delivering means to control their angularity, the manipulation of said adjustable control means altering the angularities of said delivering means through different extents to cause each of them to deliver its tape under correct angularity in accordance with the diameter of the core in accordance with which said tape is wound on said core.

12. A taping machine comprising means for feeding longitudinally a core to be taped, a cage encircling said core, means for producing a respective rotation of said cage and core, tape delivering means mounted to oscillate in said cage to adjust the angularity of tape supplied thereby with respect to axis of said core, a tape delivering bobbin loose on each of said heads, a tape guide on each head providing a bearing line parallel with the rotary axis of its bobin, said guide providing a friction tape braking surface intermediate said bearing line and bobbin having an extent which varies in agreement with the decrease of the delivery radius of the tape bobbin said surface being shaped as the envelope of tangents with tangential portions having extents equal to each other or decreasing according to a logarithmic or exponential law, and adjustable means engaging said delivering means to control their angularity, the manipulation of said adjustable control means altering the angularities of said delivering means through different extents to cause each of them to deliver its tape under correct angularity in accordance with the diameter of the core in accordance with which said tape is wound on said core.

13. A taping machine comprising means for feeding longitudinally a core to be taped, a support freely encircling said core, means for producing a respective rotation of said support and core, tape delivering means located on said support at invariable points angularly and longitudinally spaced on a helix, said tape delivering means being able to oscillate in said support to adjust the angularity of tapes supplied thereby with respect to axis of said core, and adjustable means engaging said delivering means to control their angularity, the manipulation of said adjustable control means altering the angularities of said delivering means through different extents to cause each of them to deliver its tape under correct angularity in accordance with the diameter of the core where said tape is wound on said core.

14. A taping machine, comprising means for longitudinally feeding a core to be taped, a cage encircling said core, means for producing a respective rotation of said cage and core, tape supplying means mounted in said cage at points arranged along a helix defined by $$\frac{d}{p} = s + m + f$$

in the described meaning, said tape supplying means being capable of oscillation to adjust the angularity of tape supplied thereby with respect to the axis of said core, and adjustable means engaging said supplying means to control their angularity, the manipulation of said adjustable control means altering the angularities of said supplying means through different extents to cause each of them to deliver its tape under correct angularity in accordance with the diameter of the core where said tape is wound on said core.

In testimony whereof, I affix my signature.

GAETANO DE DOMINICIS.